July 13, 1954  R. A. FINLEY  2,683,374
MEASURING SPOON
Filed June 29, 1953
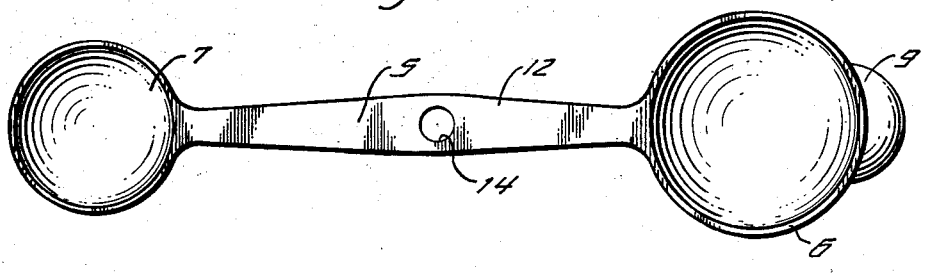
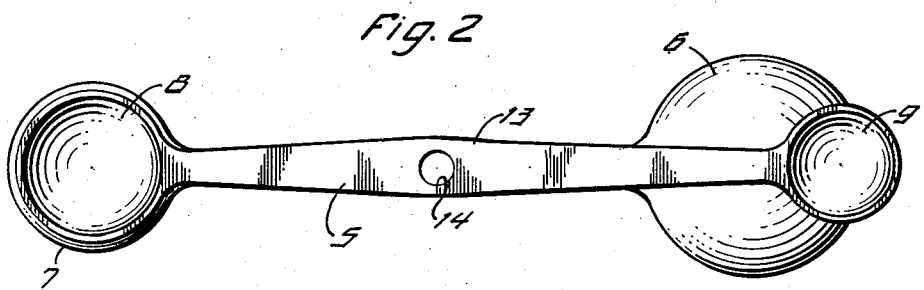
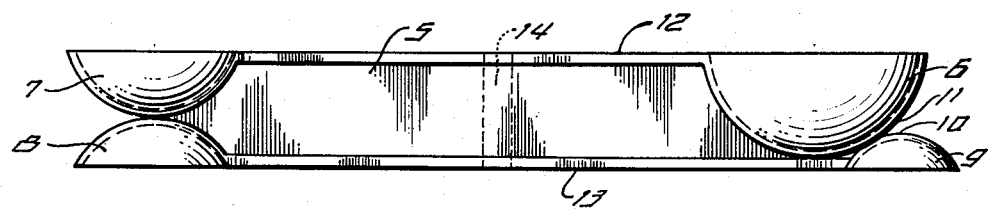
Rhodes A. Finley
INVENTOR Patented July 13, 1954

2,683,374

UNITED STATES PATENT OFFICE 2,683,374

MEASURING SPOON

Rhodes A. Finley, Santa Ana, Calif.

Application June 29, 1953, Serial No. 364,610

1 Claim. (Cl. 73—426)

This invention relates to measuring spoons, of the type usually designed for measuring, selectively, ¼, ½, and full teaspoon, and tablespoon measures of liquids or granulated condiments; such spoons may, of course, be proportioned to hold fluid ounces and fractions thereof, or other units of measure.

It is an object of this invention to provide a measuring spoon which may be placed upon a table or counter in filled condition and which will not then spill its contents. It frequently happens that when a person has poured a measured spoonful of some ingredient, he finds that the other elements of the mixture are not yet ready to receive the ingredient, or he is called upon to give his attention to some other matter. In these circumstances, with the ordinary measuring spoon, he must either carefully hold the filled spoon level while he might have use or even demand for both hands, or he must pour the contents of the spoon into some receptacle, to save them. If he places the filled spoon upon a table it will tilt or roll, and will spill at least part of its measured contents.

Another object of this invention is to provide a measuring spoon capable of being set down in two reversed positions, either of two opposed sides being bases for supporting the spoon.

It is a further object of this invention to provide a measuring spoon which is easier to handle and to clean than the ordinary group of calibrated spoons secured together pivotally by their handle ends, and which may also serve as a stirring spoon, thereby often saving and accurately admixing ingredients which tend to stick to the spoon.

In the accompanying drawing, illustrative of one embodiment of my invention, Fig. 1 is a plan view with the measuring spoon oriented in one of its reversible positions;

Fig. 2 is a plan view with the spoon oriented in the other of its reversible positions; and Fig. 3 is a side elevational view.

Having reference to the details of the drawing, my improved measuring spoon comprises a handle 5 and four spoon bowls 6, 7, 8, and 9, disposed in back-to-back pairs at opposite ends of the handle. The spoon bowls are of varied sizes; for example, the bowl 6 may be of tablespoon capacity, the bowl 7 of teaspoon capacity, and the bowls 8 and 9 respectively of ½ teaspoon and ¼ teaspoon capacity. Preferably the largest and smallest bowls, for example the bowls 6 and 9, are paired together at one end of the handle 5, and the two intermediately-sized bowls are paired together at the other end of the handle. Two bowls, one from each pair, are faced alike in the same direction, and the other two bowls are faced alike in the opposite direction.

The rims of like-faced bowls, for example the rims of bowls 6 and 7, are disposed in one plane, and the rims of the other two bowls, for example the rims of bowls 8 and 9 are disposed in a plane parallel to the plane of the first-mentioned bowls. To accomplish this arrangement, the thickness of the handle 5 in the back-to-back direction of the bowls is preferably equal to the sum of the depths of the intermediately sized bowls, 8 and 9; and the smallest bowl 9 is not centered on the center point of the largest bowl 6 but has its back or outer convexity 10 nested against an end curvature 11 of the back or outer convexity of the bowl 6, the bowls 6 and 9 thus overlapping in the direction normal to the parallel planes of their rims.

The handle 5 lies entirely within the two parallel planes established by the rims of like-facing bowls, although it preferably has its top and bottom sides 12 and 13 disposed in said parallel planes. Thus the handle 5 also becomes part of the support for the bowls, when the implement is placed on a table in either the position shown in Fig. 3 or in the reversed position; and if one end pair of bowls happens to be broken from the handle 5, the remaining end pair of bowls and the connected handle 5 still constitute a usable implement. A hole 14 may be provided in the handle 5, by which the implement may be hung on a wall-hook.

My improved measuring spoon is notably adapted for use as a stirring or whipping spoon, because the back-to-back bowl arrangements provide double the usual stirring surface, and displace and mix ingredients by following cavitation as well as by pressure. Either end of the spoon may be so used.

I claim:

A measuring spoon comprising: a handle; four spoon bowls of different sizes disposed in back-to-back pairs at opposite ends of said handle, the largest and the smallest of said bowls forming one pair and facing respectively in the same directions as the bowls forming the other of said pairs, the rim of said largest bowl being disposed in the same plane as the rim of one of the bowls of said other pair, and the back-convexity of said smallest bowl being nested against an end curvature of the back convexity of said largest bowl so that the rim of said smallest bowl is disposed in the same plane as the rim of the other bowl of said other pair, all of said handle being disposed between said two planes.

References Cited in the file of this patent

UNITED STATES PATENTS

| Number | Name | Date |
|---|---|---|
| D. 92,118 | Stuart | Apr. 24, 1934 |
| D. 156,850 | Shirley | Jan. 10, 1950 |